(12) United States Patent
Bockhold

(10) Patent No.: US 6,408,982 B2
(45) Date of Patent: Jun. 25, 2002

(54) EMERGENCY PASSENGER EVACUATION CHUTE AND CHUTE/SLIDE COMBINATION FOR AIRCRAFT

(76) Inventor: David Lawrence Bockhold, 1090 West 21st Sreet, North Vancouver, British Columbia (CA), V7P 2C5

(*) Notice: Subject to any disclaimer, the term of this patent is extended or adjusted under 35 U.S.C. 154(b) by 0 days.

(21) Appl. No.: 09/726,439

(22) Filed: Dec. 1, 2000

(30) Foreign Application Priority Data

Dec. 7, 1999 (CA) ............................................. 2292024

(51) Int. Cl.$^7$ .............................. A62B 1/20; B64C 1/22
(52) U.S. Cl. ..................................... 182/48; 244/137.2
(58) Field of Search ........................ 182/48, 43; 193/2; 244/137.2

(56) References Cited

U.S. PATENT DOCUMENTS

| | | | |
|---|---|---|---|
| 3,301,347 A | * 1/1967 | Saita ............................ | 182/48 |
| 3,952,976 A | * 4/1976 | Fletcher et al. ...... | 244/137.2 X |
| 3,994,366 A | 11/1976 | Okuma et al. | |
| 4,005,762 A | * 2/1977 | Zephinie ..................... | 182/48 |
| 4,037,685 A | 7/1977 | Talucci | |
| 4,398,621 A | * 8/1983 | Baker ........................... | 182/48 |
| 4,580,659 A | * 4/1986 | Baker ........................... | 182/48 |
| 4,582,166 A | 4/1986 | Baker | |
| 4,605,095 A | 8/1986 | Koizumi | |
| 4,681,186 A | * 7/1987 | Leisman et al. .......... | 182/48 X |
| 4,705,141 A | * 11/1987 | Splaine ........................ | 182/48 |
| 5,060,753 A | * 10/1991 | Hopkins ..................... | 182/48 |
| 5,320,195 A | * 6/1994 | Reece et al. .................. | 182/48 |
| 5,562,184 A | 10/1996 | Yung-ho | |
| 5,870,066 A | * 2/1999 | Reece ........................... | 182/48 |
| 6,102,762 A | * 8/2000 | Bell et al. ................. | 182/48 X |

FOREIGN PATENT DOCUMENTS

| | | |
|---|---|---|
| AU | 58576/73 | 1/1975 |
| AU | B-49258/85 | 5/1986 |
| CA | 1 263 092 | 11/1989 |
| CA | 1 266 241 | 2/1990 |
| FR | 2 533 444 A1 | 3/1984 |
| GB | 1 490 855 | 11/1977 |
| GB | 1 490 856 | 11/1977 |
| GB | 1 490 857 | 11/1977 |
| GB | 2 124 168 A | 2/1984 |
| GB | 2 168 008 A | 6/1986 |

* cited by examiner

Primary Examiner—Daniel P. Stodola
Assistant Examiner—Hugh B. Thompson
(74) Attorney, Agent, or Firm—Adrian Zahl

(57) ABSTRACT

A passenger evacuation arrangement for emergency use in aircraft, and in particular for evacuating passengers from an upper deck or decks of a multi-deck aircraft safely to ground level, which is compact when stowed and which safely, rapidly and effectively evacuates passengers to ground level. The evacuation arrangement consists of a marine-type evacuation chute, and a frame for suspending the chute overboard of an aircraft in a vertical orientation, wherein the frame is relatively compact when in a stowed position. In another version, an evacuation system combines an upper chute portion and a lower slide portion.

25 Claims, 7 Drawing Sheets

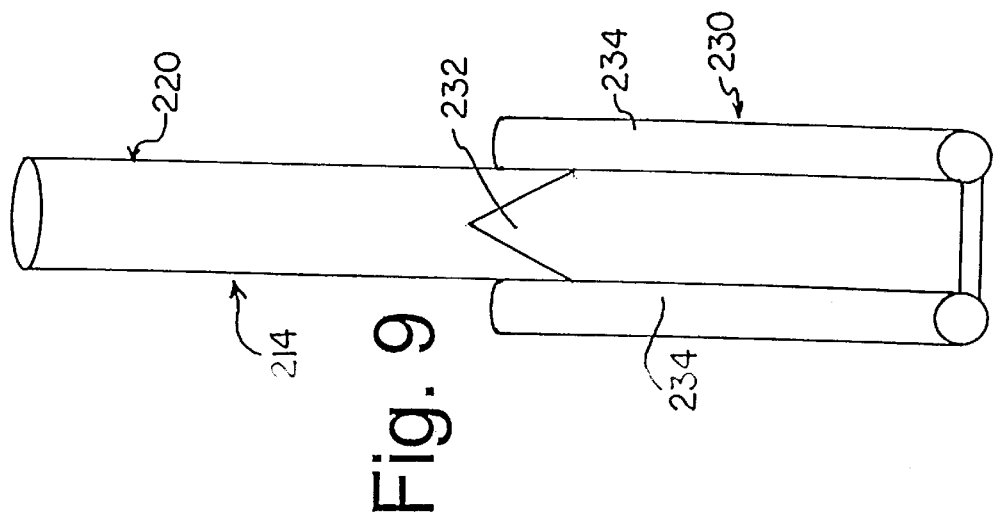
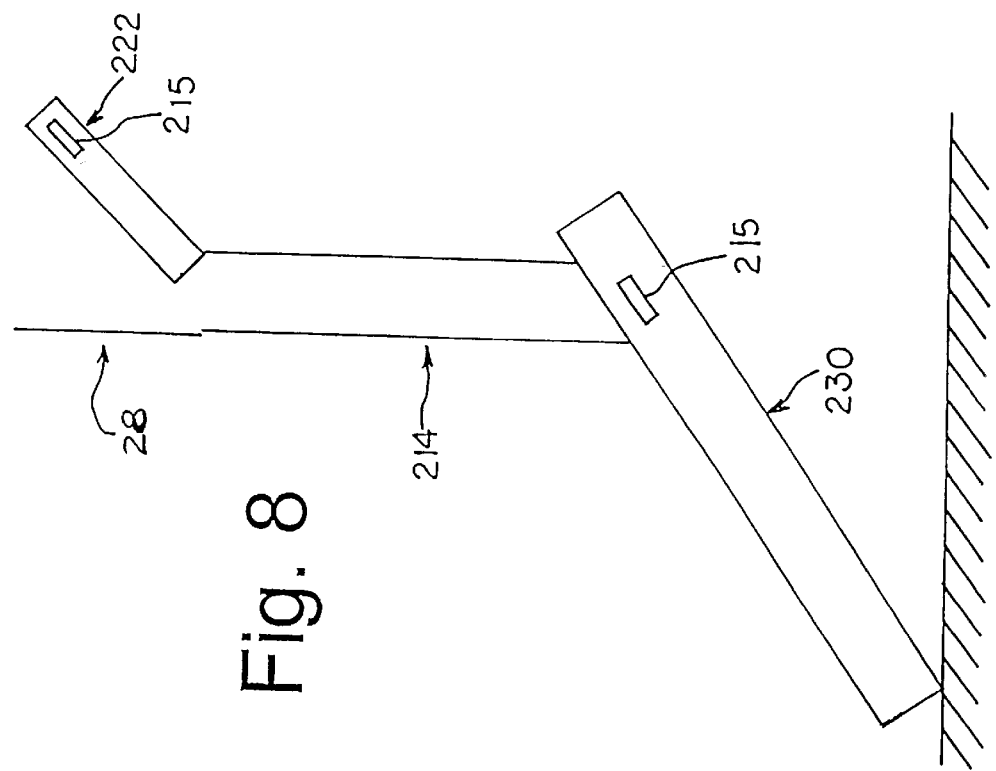

EMERGENCY PASSENGER EVACUATION CHUTE AND CHUTE/SLIDE COMBINATION FOR AIRCRAFT

FIELD OF THE INVENTION

The present invention relates to passenger evacuation arrangements for aircraft safety, and in particular to a chute and associated deployment structures for evacuation of passengers from an upper deck of an aircraft in the event of an emergency.

BACKGROUND OF THE INVENTION

Modern aircraft design, and in particular the proposed introduction of multi-deck aircraft into the fleet of commercial passenger aircraft, has given rise to novel safety concerns. In particular, rapid evacuation of passengers from the upper deck of an aircraft in the event of an emergency can pose problems. Conventional aircraft design calls for evacuation slides that may be deployed from an aircraft hatch. However, this arrangement is not well suited for use with an aircraft having two or more passenger decks, in which the upper deck is at a significant remove from the base of the aircraft fuselage. In particular, conventional inflatable aircraft slides do not typically possess the rigidity to accommodate a large lateral displacement between the top and bottom of the slide. Thus, such slides cannot readily accommodate the drop from the upper deck of a double deck aircraft. For this application (and others) there exists a need for alternative arrangements for evacuating passengers that are readily adaptable to applications involving lengthy drops.

It is proposed herein to apply certain of the principles and teachings of marine vessel evacuation arrangements for use in aircraft.

It is known within marine vessels to provide an emergency passenger evacuation arrangement that comprises an elongate fabric tubular member that may be suspended from an upper deck of the vessel. Typically, a framework is fixed to the vessel deck to support the chute. The interior of the tube or chute incorporates a means for slowing the rate of descent of passengers within the tube. With such an arrangement, passengers enter the tube from an upper deck of the vessel, and descend through the tube onto a waiting life raft or the like. Such an arrangement offers the advantage of being able to carry passengers in safety down a long descent. Further, the tube may be retained in a folded or bunched form within a relatively compact housing when not in use, and thus this arrangement represents when stowed a light weight and compact arrangement. Further, such a tube may be provided in virtually any length. Since the tube is suspended vertically rather than angled, structural rigidity is not required.

Examples of conventional marine evacuation passenger chutes may be found within the following references:

U.K. Patent Application No. 2,168,008 (Koizumi)

U.K. Patent No. 1,490,855 (Fujikura Rubber Works Limited)

U.S. Pat. No. 4,605,095 (Koizumi)

Conventionally, a marine chute deployment arrangement comprises a frame or the like fixedly mounted to a deck of a vessel, a portion of which overhangs the edge of the vessel to suspend the chute in a position somewhat displaced from the side of the vessel. The overhanging portion may either permanently overhang the vessel gunnel or be moveable between a fully inboard position and an overboard position upon deployment of the chute. A chute fabricated from fabric or other flexible material is housed in a folded or bunched form within a container associated with the frame, when in the stowed position. One end of the chute is fastened by cords or the like to the frame. Upon deployment of the chute, the chute is removed from the container and lowered or dropped over the side of the vessel, with the chute remaining attached and suspended at its upper end from the frame.

Within the chute, the rate of descent of passengers through the chute is controlled by various means. Typically, the chute comprises inner and outer fabric layers, with the inner chute layer forming a tortuous zig-zag path for effectively slowing the rate of descent of passengers within the chute. Alternatively, the inner chute layer may be partly elasticized, or other constriction means may be employed to create friction between the body of the user and the chute material.

In another aspect, an inflatable passenger platform may be associated with the base of the chute to receive descending passengers and provide a waiting area for the arrival of rescue craft. Further, various tensioning means permit users to properly tension the chute following deployment.

Within one aspect of the present invention, it is proposed to employ a generally conventional marine-type evacuation chute, in association with a frame and housing specifically adapted for aircraft use, in order to provide an emergency aircraft evacuation arrangement. The foldable chute may be conveniently stowed in an appropriate housing when not in use, and a frame specifically adapted for aircraft use suspends the chute over the side of an aircraft adjacent an escape hatch. It is noted that within conventional marine chute evacuation arrangements, the structure that suspends the chute over the side of the vessel is typically relatively large and is permanently fixed to the deck of the vessel adjacent the gunnel for rapid deployment of the chute. Such an arrangement is generally suitable for marine use. However, within the small confines of an aircraft, it is essential that a more compact deployment arrangement be provided, and it is further desirable to provide an arrangement whereby the frame may be positioned at some remove from the hatch when not in use, in order to provide free access to the hatch for entering and exiting passengers during normal aircraft operation. As well, it is of course essential that the chute deployment structure be capable of being housed entirely inboard of the aircraft when not in use and only extend outwardly from the aircraft when deployed.

In another aspect, the invention addresses the need during emergency evacuation of aircraft for particularly rapid passenger evacuation protocols. Thus, it is desirable to provide a rapid means for discharging passengers. One drawback of a marine type chute extending the full drop from an upper airplane deck is the time required for passengers to slide through such a tube. Thus it is desirable that at least a portion of the chute be replaced with a more expeditious evacuation arrangement. A further cause of delay can result from the hesitation experienced by untrained individuals at the moment of entry into and evacuation chute. In order to minimize this delay, it is desirable to provide an entry arrangement which does not commence with a vertical drop. Thus conventional chute arrangements may be modified to provide a non-vertical region at the upper end of the chute.

It is further desirable to provide a lightweight deployment structure for a chute arrangement that achieves a portion of its structural integrity and rigidity from the airframe of the aircraft, thus minimizing the weight and bulk of the structural elements of the device.

SUMMARY OF THE INVENTION

It is an object of the present invention to provide a passenger evacuation arrangement for emergency use in aircraft, and in particular for evacuating passengers from an upper deck or decks of a multi-deck aircraft. The invention may however be used in connection with other types of aircraft. It is a further object to provide an emergency evacuation arrangement for aircraft passengers, which is relatively light weight and compact when stowed and which safely, rapidly and effectively evacuates passengers to ground level. It is a further object to provide an arrangement consisting of a marine-type evacuation chute, and a frame for suspending the chute overboard of an aircraft in a vertical orientation, wherein the frame is relatively compact when in a stowed position. Conveniently, the frame may be stowed within any convenient location within the aircraft in a region within the vicinity of an escape hatch and is at least partly supported when in use by the aircraft frame.

In one aspect, the invention comprises an aircraft emergency passenger evacuation chute arrangement for discharging passengers from a hatch of an aircraft, comprising:

an elongate flexible tubular chute for conveying descending passengers when said chute is vertically suspended;

a carrier structure for stowing said chute within a folded or bunched stowage position, optionally including a chute support within said structure for supporting said chute wherein said chute support is separable from said carrier structure;

a chute suspension frame is associated with said carrier structure and engaged to an upper end of said chute. The frame is moveable between a stowed position substantially adjacent to or enclosed within the carrier structure, and a deployment position wherein the frame extends outwardly away from the carrier structure to displace a portion of the frame outwardly from the aircraft for the suspension of the chute from the frame portion;

means for removing said chute from said carrier structure; and means for displacing said carrier structure from a stowage position inboard of said aircraft and spaced apart from said hatch, to a deployment position abutting the shell of said aircraft at said hatch.

Preferably, the suspension frame is longitudinally extensible and more preferably telescopic, for movement between a collapsed, stowed position associated with said carrier structure, to an extended deployment position extending outwardly from said housing.

Conveniently, the suspension frame is pivotally mounted at the base thereof to said carrier structure, preferably at the rear of the structure, for movement between a stowage position within or adjacent to said housing, to a deployment position wherein said support frame angles upwardly and outwardly relative to said aircraft.

The invention conveniently further comprises a pivotal mounting for the chute support. The pivotable mount, within the carrier structure, permits the support to rotate between a first position wherein the chute is enclosed within the said carrier structure, to a second, deployment position wherein the support angles downwardly and outwardly relative to the aircraft by an angle sufficient to carry the chute by force of gravity outwardly from said the housing.

Preferably the invention further comprises a chute housing for containing the chute. The housing is openable to release the chute therefrom upon deployment, the housing is releasably positioned within the carrier structure, and optionally carried on the chute support.

Conveniently, the housing comprises a base and cover frictionally engaged together and adapted to separate upon suspension of the chute from the suspension frame.

Conveniently, the chute is enclosed within an carrier structure defined by a base supporting the chute. The base is carried by the support and moveable relative thereto for deployment relative to the housing upon tilting of the support by a predetermined degree.

In a further aspect, the invention comprises a deployment arrangement for stowing and deploying a flexible chute, comprising the elements of the deployment structures characterized above.

In a further aspect, the invention comprises a method of deploying a chute from an aircraft, characterized by the steps of:

providing an elongate flexible tubular chute, a carrier structure for stowing the chute within a folded or bunched stowage position, a suspension frame associated with the carrier structure and engaged to an upper end of the chute, with the frame being pivotally mounted to the carrier structure;

displacing the carrier structure within the aircraft, from a stowage position in board of the aircraft and spaced apart from the hatch, to a deployment position abutting the shell of the aircraft at the hatch;

pivoting the suspension frame to a position whereby the suspension frame extends outwardly from the aircraft;

fastening the carrier structure to the aircraft frame at the deployment position, whereby the structural rigidity of the suspension frame is enhanced;

removing the chute from the carrier structure whereby the chute is suspended in a generally vertical position from the suspension frame.

Conveniently, the suspension frame is longitudinally extendable, and is extended longitudinally to form the deployment position. Further the suspension frame is conveniently pivoted from a stowage position substantially inboard of the carrier structure, to a deployment position where in the frame extends outwardly and upwardly relative to the aircraft.

In a further aspect, the invention comprises an aircraft emergency evacuation arrangement comprising a flexible evacuation chute, as characterized above, which extends but part way down to ground level when suspended from an aircraft. The lower end of the chute mates with an inflatable slide which when inflated carrier passengers from the lower end of the chute to ground level. A deployment structure suspends the chute and slide overboard of the aircraft in a deployment position, and carries the chute and slide inboard in a collapsed, storage position. The lower slide portion comprises a generally conventional aircraft emergency slide, including gas canisters for self-inflation upon deployment. The chute and slide are deposited directly on the slide for an uninterrupted journey.

The chute/slide combination permits the use of a shorter chute, with its attendant advantages of confronting passengers with a less of an intimidating vertical drop.

In a further aspect, a relatively short entry slide may be provided, in order to further ease fears of passengers. In this aspect, a self-inflating slide is mated to the upper end of the chute, whereby passengers may enter the chute via the entry slide. This permits passengers to enter the evacuation arrangement without being initially presented with the prospect of a vertical drop. Passengers will be less inclined to hesitate before entering the arrangement, this speeding up the evacuation process.

As used herein in reference to the chute deployment structure, the directional references "front" and "rear" refer to the directions facing the aircraft shell and aircraft interior, respectively, along an axis transverse to the elongate axis of the aircraft.

Having thus generally characterized the features of the invention, preferred embodiments of the invention will now be described in detail with reference to the accompanying drawings.

BRIEF DESCRIPTION OF THE DRAWINGS

FIG. 8 is a front elevational view of a deployment arrangement according to an alternative embodiment; and FIG. 9 is a side elevational view of the arrangement shown in FIG. 8.

DETAILED DESCRIPTION OF THE PREFERRED EMBODIMENTS

Referring to the figures, a deployment apparatus according to the present invention is designated globally as 10, and is illustrated herein installed within an aircraft. It is contemplated that the aircraft may comprise a multi-deck aircraft 12 (only a part of which is shown), such as a Boeing 747™ or the like, with the apparatus being installed within an upper deck of the aircraft. However, it will be seen that the apparatus may be used in association with any relatively large aircraft characterized by a significant drop between a passenger deck and ground level. The aircraft includes generally conventional passenger hatches or doors for egress of the passengers.

Figure 1:
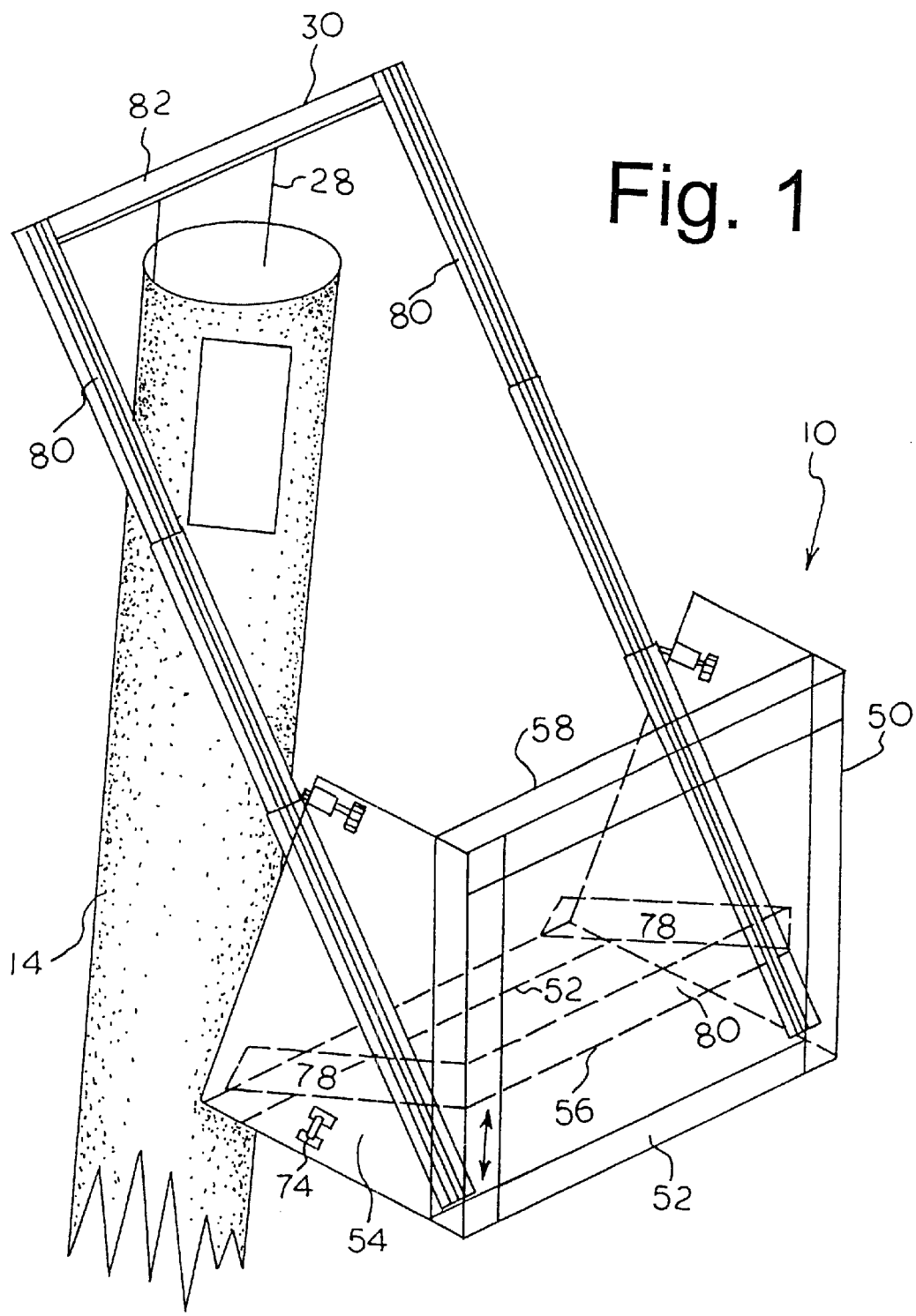
FIG. 1 is a perspective view of a deployment apparatus according to the present invention with the chute housing and side bracing removed for clarity.
Figure 2:
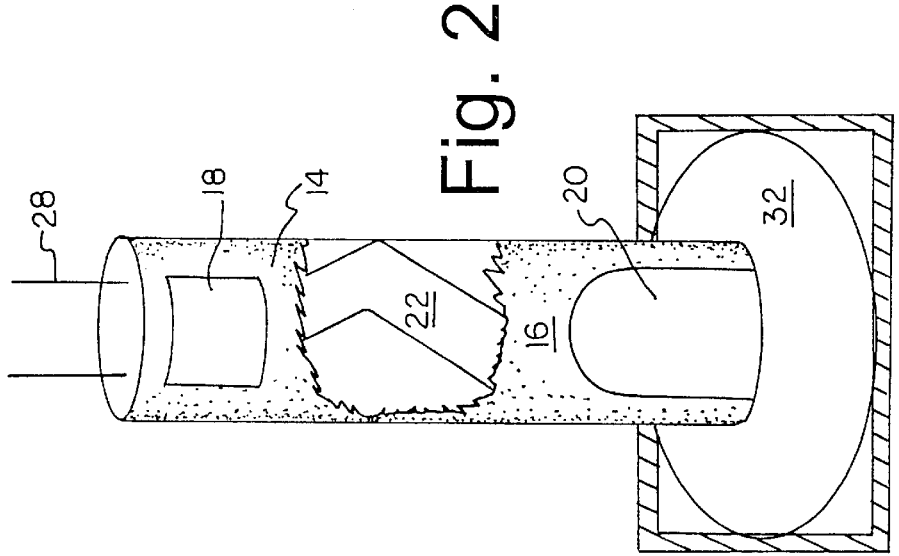
FIG. 2 is a side elevational view, partly in section, of a deployment chute.

The chute portion of the apparatus comprises a generally conventional tubular fabric chute 14, of the type conventionally used within marine vessel evacuation arrangements. As seen in FIGS. 1 and 2, the chute comprises a tubular outer wall 16; an entry portal 18 at the upper end of the chute, and an exit portal 20 at the lower end for passengers entering and exiting the chute, respectively. The interior of the chute features conventional passenger descent control means for slowing the rate of descent of passengers through the chute. For example, the chute may comprise inner and outer fabric layers 22 and 16 respectively, with the inner layer 22 stitched to the outer layer to form a zig-zag shaped tortuous path. The chute is suspended by an array of cables or lines 28 incorporated into an upper end of the chute and fastened to a suspension frame 30, as will be described below. An inflatable passenger reception platform 32 is integral with the base of the chute, as will be discussed below. The platform is inflatable and serves both to cushion descending passengers at the base of the chute and as an emergency life raft for use in waterborne situations. The embarkation platform is provided with conventional self-inflation means, such as gas canisters (not shown), which are triggered by deployment of the chute.

When stowed, the chute 14 is housed within a chute storage housing 34, seen more particularly in FIG. 4. The base of the housing 34 is formed from a rigid rectangular tray 36, comprising a flat floor 38 and low sidewalls 40. A removable cover 42 is frictionally engaged to the housing base 36. The chute 14 is folded in any suitable manner within the housing 34, with the chute 14 being folded so as to virtually eliminate the possibility of entanglement when the chute is deployed upon releasing the base of the housing from the cover, in a manner to be described in detail below.

In the stowed position, the chute housing 34 is carried within a carrier structure 50 formed from a rigid framework suitable for mounting within the interior of an aircraft in a manner to be described below. Preferably, the carrier structure is fabricated from aircraft grade aluminum for strength and light weight.

The carrier structure 50 comprises in general terms a pair of spaced apart horizontal front and rear elongate base members 52 extending laterally the width of the framework; a pair of sidewalls 54 forming the sides of the carrier structure; and housing support 56 mounted within the interior of the carrier structure. The front and top portions of the carrier structure are substantially open. An upper cross member 58 spans the sidewalls 54 and provides structural rigidity. Structural members 60 at the sides of the carrier structure angle upwardly from the rear lower corners of the carrier structure to form a rigid angled support. When the carrier structure 50 is positioned in the deployment position, as will be discussed below, the structural members 60 lend structural support to the carrier structure thereby substantially preventing movement of the carrier structure relative to the aircraft.

Figure 3:
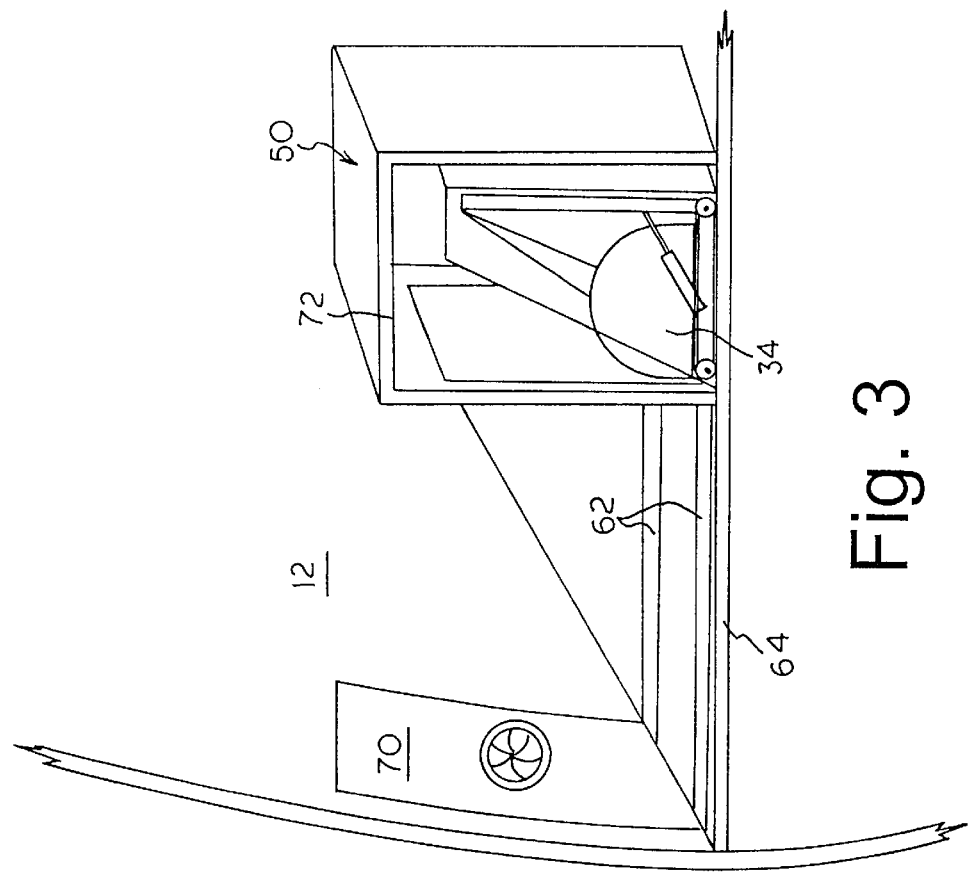
FIG. 3 is a further perspective view, partly in section, showing the invention within the stowed position, within an aircraft.

The base members 52 of the carrier structure are each slideably mounted to a corresponding recessed track 62 installed within the aircraft deck 64, as seen in FIG. 3, specifically mounted therein for purpose of engaging the carrier structure. The tracks 62 extend transversely relative to the aircraft axis and preferably are recessed into the aircraft floor 64. In a stowed position, the carrier structure 50 is conveniently positioned at some remove from the aircraft hatch or door 70, to permit passenger access to the door 70 within the normal course of aircraft operation. Conveniently, the carrier structure may be stowed within an enclosed compartment 72 within the aircraft and thus remain out of sight to aircraft users during normal aircraft operations. Upon deployment, the structure 50 is moved manually along the tracks 62 to a position at the edge of the aircraft deck abutting the door frame 70 of the aircraft. A conventional latch or lock means 74 locks the structure to the track within either of the stowed or operational positions. A second lock means fix the side structural supports of the carrier structure to the aircraft frame adjacent the hatch, thereby rigidly fastening the carrier structure 50 to the airframe of the aircraft.

Within the carrier structure 50, the chute housing 34 is carried on the housing support 56, which is pivotally mounted within the interior of the carrier structure. The housing support comprises three elongate rails, forming a pair of side rails 78, spanned at one end by a third member 80. The three members are arranged to form a planar generally rectangular structure open at the front of the carrier structure. The side rails 78 are pivotally mounted to the base of the carrier structure at the front of the carrier structure, thereby permitting the rear of the housing support to swing upwardly with the front of the support thus angling downwardly towards the front of the stowage structure. Within the stowed position seen in FIG. 3, wherein the chute housing is enclosed within the carrier structure, the housing support resides within a generally horizontal position. Frictional engagement of the housing on the housing support substantially prevents slippage of the housing relative to the support during normal aircraft operation. The housing support 56 is tilted forwardly to effect deployment of the chute 14, as will be described in greater detail below.

A chute suspension frame 30, seen in detail in FIGS. 1 and 4(a) to (c), is associated with the carrier structure 50 for suspension of the chute 14 upon deployment. The suspension frame 30 comprises a pair of parallel, spaced apart telescoping struts 80, with a cross bar 82 spanning the free ends of the respective struts. The telescoping action may be actuated either manually or more preferably by means of one or more internal fluid-driven cylinders (not shown). The suspension frame 30 may be collapsed and pivoted rearwardly for stowage, and in this position fits within the confines of the chute carrier structure 50. The base of the suspension frame is pivotally mounted to the base of the carrier structure 50 at a position towards the rear of the carrier structure, whereby within a stowed position the collapsed frame is housed within the carrier structure within a generally vertical position towards the rear of the structure. Within the deployed position, seen in FIGS. 1, 4(a) to (c) and 5, the frame 30 is pivoted forwardly, to angle upwardly and outwardly relative to the carrier structure 50.

Pivotal movement of the chute suspension frame 30 is actuated by hydraulic cylinders 85 or the like. Additionally, a cable 88 may be provided to anchor the suspension frame 50 to the aircraft 12. Conveniently, the cable 88 is permanently fastened at one end to the cross bar and at an opposed end to an anchor 90 fastened to the aircraft 12 in the region of the stowage compartment 72 provided for the carrier structure. A further anchoring of the support frame is conveniently provided by way of a locking mechanism, which may comprise a simple threaded rod, which fastens the structure to the aircraft frame by attachment to a mating threaded socket, adjacent the hatch. When thus anchored by the above means, the support frame is anchored to the aircraft with great rigidity, thus providing a suitable support structure for the deployed chute to safely support the weight of the chute and multiple passengers with a significant safety margin.

A chain drive 100 connects the struts 80 with the housing support 76, whereby forward rotation of the suspension frame 30 translates into a corresponding pivotal movement of the housing support 76 to rotate and tilt the support downwardly and forwardly. As will be discussed below, positioning of the suspension frame 30 into the deployment position achieves sufficient tilt of the support 76 to permit the chute housing 34 to slide off of the support 76 to effect deployment of the chute 14.

An array of suspension lines 28 joins the chute 14, through the upper portion of the chute housing 42, to the cross bar 82 of the chute suspension frame 30. The suspension lines 28 are permanently fastened to the suspension frame 50, whereby upon deployment of the chute 14, the chute remains suspended from the suspension frame 50.

Figure 4A:
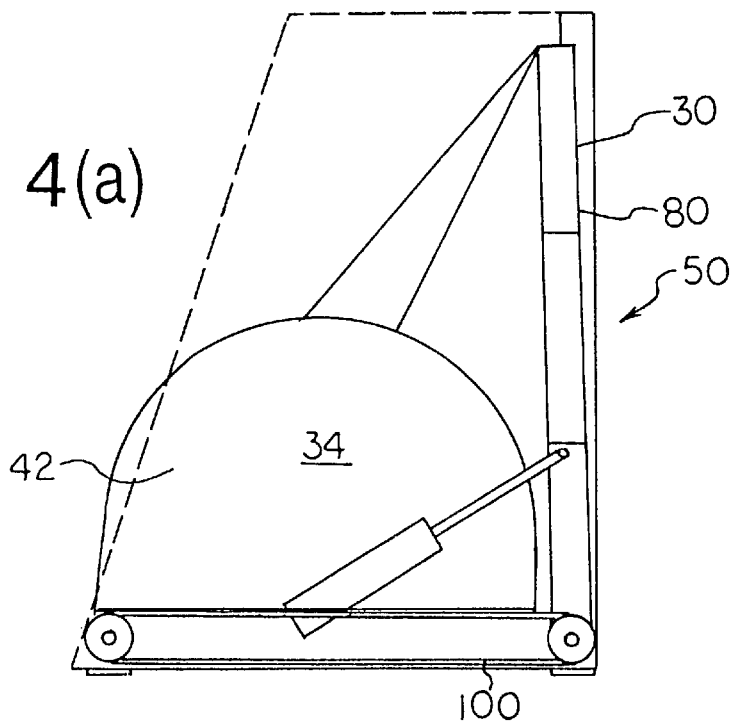
FIGS. 4(a)–(c) are schematic views illustrating a chute deployment sequence.
Figure 4B:
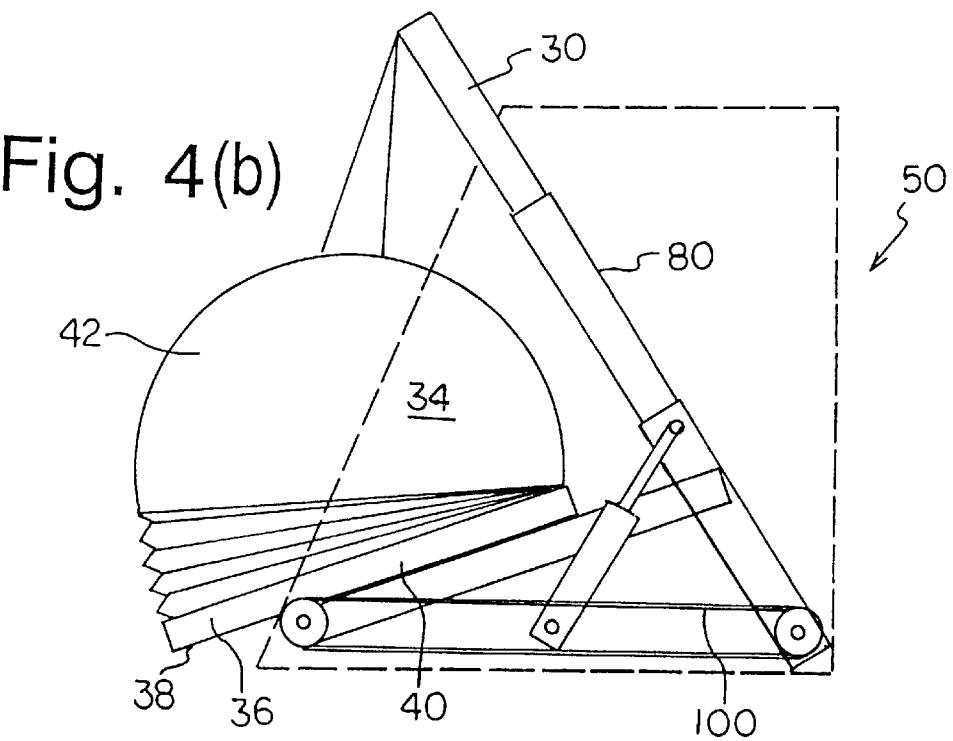
Figure 4C:
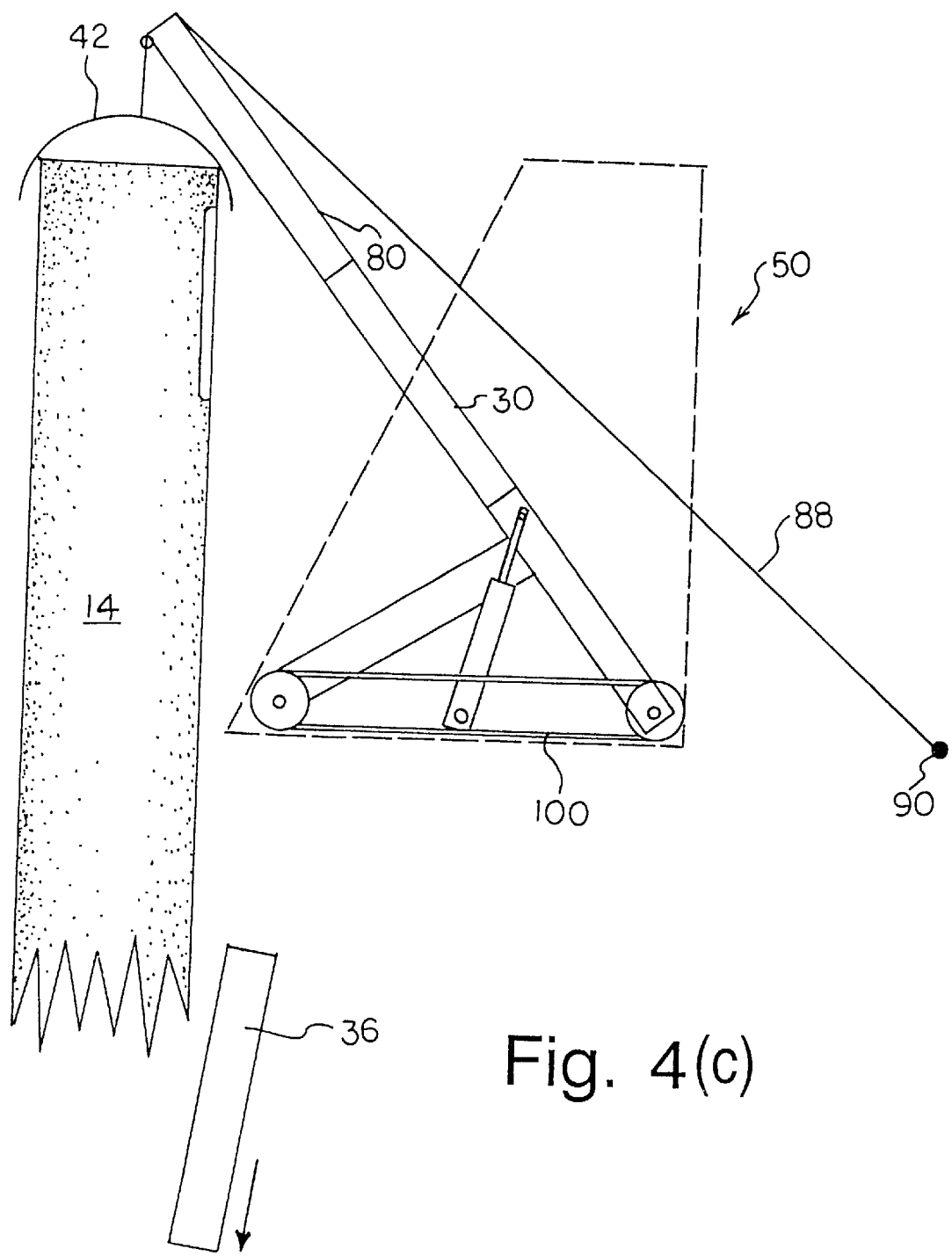
Figure 5:
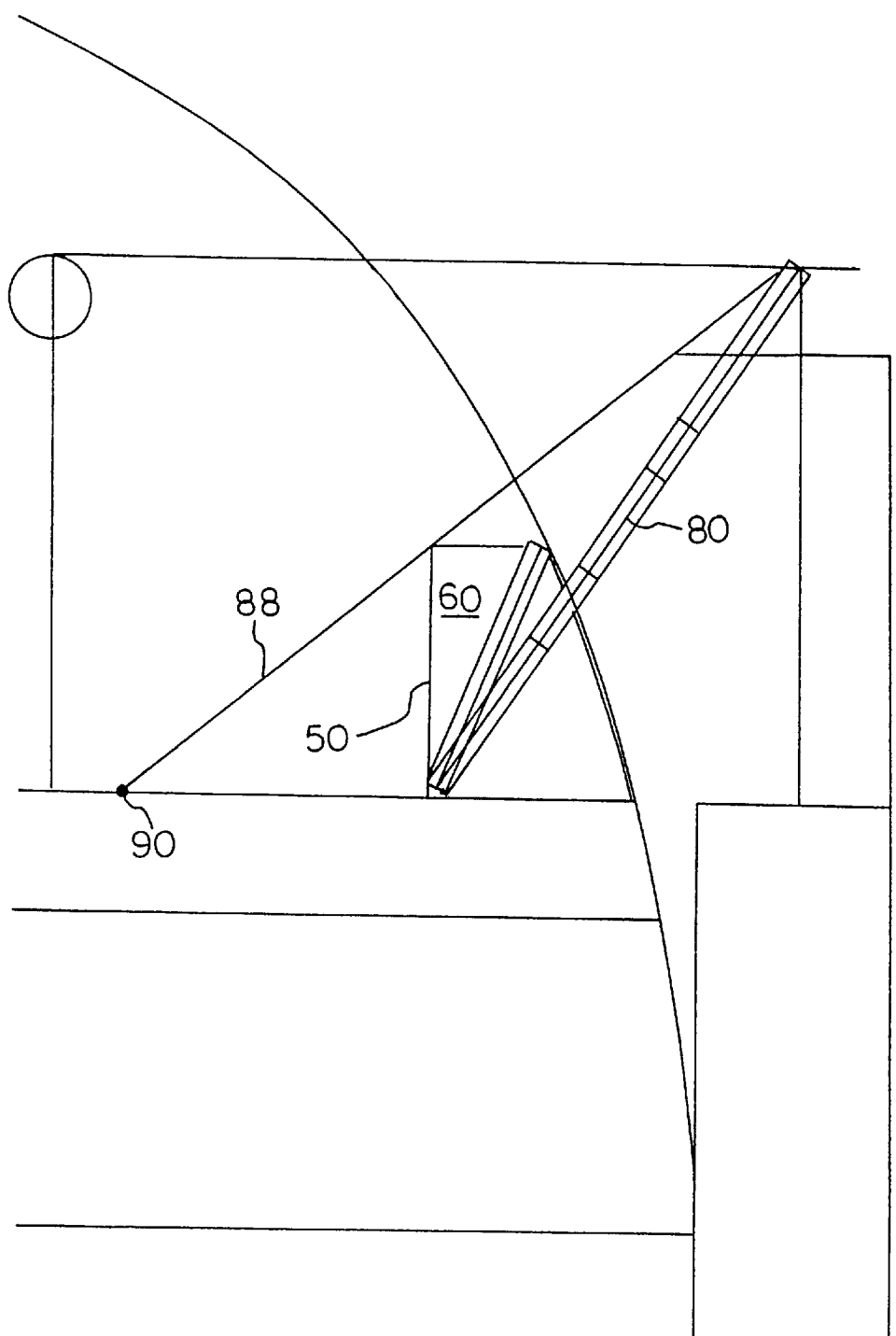
FIG. 5 is a side elevational view showing the device in a deployment position, within an aircraft.

Operation of the invention will now be described by reference to FIGS. 3, 4(a) to (c) and 5. The stowage position of the system consists of the suspension frame 50 being collapsed and pivoted to a generally vertical position against the rear of the carrier structure 50, as seen in FIG. 4(a). The carrier structure 50 would normally be retained within an aircraft compart 72 specifically intended for this use, as seen in FIG. 3. Within the carrier structure 50, the chute 14 is housed within its housing 34 in a folded form and the housing is in turn supported within the carrier structure in generally horizontal position. In the event of an emergency, the aircraft hatch is opened by aircraft personnel and the carrier structure 50 is moved long the tracks 62 to a position abutting the hatch, seen in FIG. 5. The carrier structure would then be locked into position on the track and the aircraft wall adjacent the hatch 70. The suspension frame 30 is then swung outwardly from the interior of the carrier structure 50, to a position angling upwardly and forwardly out the hatch 70 as shown in FIG. 4(b). The chute suspension frame 30 would then be telescoped and locked into its elongated position wherein the upper portion of the frame extends overboard of the aircraft, by means of actuating the hydraulic cylinders or otherwise. As seen in FIG. 4(b), the extension of the frame draws the chute upwardly and thus separates the chute housing cover 42 from the base 36. As well, the forward rotation of the frame 30 angles the tray support 76 towards the front of the carrier structure 50 and draws the chute housing 34 forwardly, thus causing the chute 14 and its associated housing to slide forwardly off the tray support 76 for deployment as will be described in more detail below. Further extension of the frame 30, seen in FIG. 4(c), fully deploys the chute outside of the aircraft 12. Within this position, the frame is positioned to suspend the chute alongside and spaced slightly apart from the hull of the aircraft.

It will be seen that in order to properly position the chute 14 relative to the aircraft hull 12, the fully extended length of the struts 80 of the chute suspension frame 30 and their angle of disposition in the deployment position must be selected to achieve sufficient lateral displacement.

As discussed above, telescopic elongation of the struts 80 upon deployment draws the chute suspension cables 28 upwardly, thereby drawing upwardly the cover portion 42 of the chute housing 34. At the same time, the housing base 36 remains on the supports 76, being thereby separating the housing cover 42 from the base portion 36. The frictional engagement between the base and cover is such that the weight of the base and the chute carried within the base are sufficient to permit the cover and base portions to separate as the cover is hoisted upwardly. The forward pivoting of the support frame 30 further pivots the support 76 into an angled position, whereby when a suitable angle is attained, the base 36 and accompanying lower portion of the chute 14 slides overboard clear of the aircraft, via gravitational force. The base 36 will thereupon separate from the chute 14, permitting the chute to be suspended from the suspension frame 30 in a useable deployment position wherein the chute is fully extended. As discussed above, inflation of the passenger reception platform 32 is triggered upon deployment of the chute.

Exiting passengers are then able to enter the chute 14, through the hatch and the chute entry portal, and descend downwardly to the base of the chute.

Figure 6:
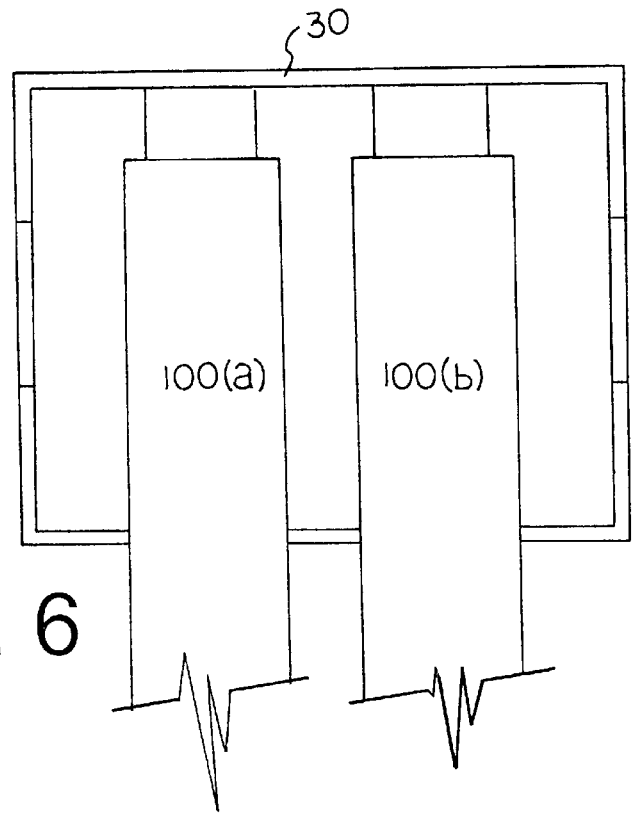
FIG. 6 is a front elevational view of the device in a deployed position, showing a further embodiment.
Figure 7:
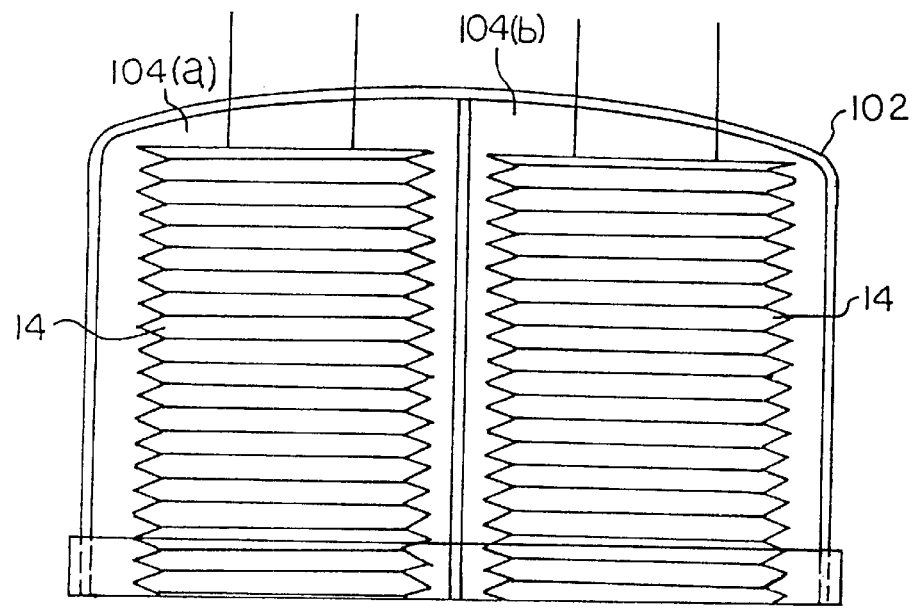
FIG. 7 is a sectional view of a chute compartment according to the second embodiment.

In a further embodiment shown in FIGS. 6 and 7, twin evacuation chutes 100(a) and (b) are provided to achieve an expedited passenger evacuation. This arrangement is particularly desirable in many aircraft to rapidly accommodate a large number of passengers. In this version, the various elements of the arrangement are sized to accommodate the dual chutes but are otherwise generally unchanged in their design and method of operation. The structures will desirably have an increased strength to accommodate the greater weights and the increased spans associated with some of the framework components.

The chute enclosure housing 102 in this version may conveniently incorporate two separate internal compartments 104(*a*) and (*b*) to separately house the twin chutes without entanglement.

In a further embodiment, as shown in FIGS. 8 and 9, there is provided an upper entry slide portion 220 and a lower slide portion 230 in combination with an evacuation chute 214. The chute 214 is a substantially vertical escape chute as generally described above.

The upper slide portion 220 preferably includes an entrance way or access way 222 having an angled sliding portion, along which the evacuees enter the upper slide 220 from the hatch of the aircraft. The upper portion is stitched or otherwise joined to the chute 214 in such a manner that passengers may slide down the upper slide 220 and slide directly into the chute 214. The upper slide portion 220 is formed from inflatable members, which conveniently are filled by associated gas canisters 215 which are released upon deployment of the chute arrangement. Passengers enter the upper slide portion 220 prior to entering the vertical chute 214. The downward velocity of the passengers exiting the slide effectively increases their speed through the chute, due to increased downward momentum as they enter the chute portion 214. This rapidly deploys passengers into the chute. The more "user friendly" nature of the slide also helps prevent from occurring passenger hesitation at entering a long, vertical chute.

The lower slide portion 230 as shown in FIGS. 8 and 9 is affixed through any conventional means to the lower end of the vertical chute 214. Chute 214 includes an exit portal 232 (see FIG. 9) at the lower end of the chute 214 for evacuees to exit onto the lower slide portion 230. Preferably, the lower slide portion 230 includes an inflatable structure including side walls 234 to aid in allowing evacuees to properly orient themselves when exiting the vertical chute with inflation canisters described above. In use, the lower slide portion provides for the transference of the vertical momentum to a horizontal momentum of an evacuee in order to allow the evacuee to clear the way for the following evacuees. Conventional gas canisters 215 permit self inflation of the chute upon deployment.

It will be seen that the above slide portion slide/chute combination may comprise a dual chute arrangement of the type characterised above, with each chute having the upper and/or lower slide as above.

As described above in various embodiments of the present invention, the chute 214 may include attachment means, carrier means, housing means and suspension frame means as described in detail above which may be utilized with the present embodiment. However, other attachment, carrier, housing and suspension frame means may be used, by themselves or in combination, in a manner as would be readily understood by a person skilled in the art. Desirably, the slide portions 220 and 230 in accordance with the present invention may be constructed of an inflatable material or a fabric or other conventional materials in the art. Further, only one of the slide portions 220 or 230 may be provided with the chute 214 being modified to extend further upwardly or downwardly as the case may be.

In a further alternative embodiments, the lower slide portion 230 may be detachable from the lower end of the chute 214, and if desired, may be used as a life raft or flotation device.

It will be seen by those skilled in the art to which this invention pertains that although the present invention has been described and characterized by way of a preferred embodiment, numerous departures from and variations to the invention may be made, without departing from the spirit and scope of the present invention as defined within the appended claims.

I claim:

1. An aircraft emergency passenger evacuation chute arrangement for discharging passengers from a hatch of an aircraft, comprising:
    an elongate flexible tubular chute for conveying descending passengers;
    a carrier structure for stowing said chute within a folded or bunched stowage position;
    a chute suspension frame associated with said carrier structure and engaged to an upper end of said chute, said frame being moveable between a stowed position substantially adjacent to or enclosed within said carrier structure and a deployment position wherein said frame extends outwardly away from said carrier structure to displace a portion of said frame outwardly from said aircraft for the suspension of said chute from said portion in a generally vertical position;
    means for removing said chute from said carrier structure; and
    means for displacing said carrier structure from a stowage position inboard of said aircraft and spaced apart from said hatch, to a deployment position abutting the shell of said aircraft at said hatch.

2. The evacuation chute arrangement as defined in claim 1, wherein said suspension frame is longitudinally extensible, for movement between a collapsed, stowed position associated with said carrier structure, to an extended deployment position extending outwardly from said housing.

3. The evacuation chute arrangement as defined in claim 2, wherein said suspension frame is telescopic.

4. The evacuation chute arrangement as defined in claim 1, wherein said suspension frame is pivotally mounted at the base thereof to said carrier structure, for movement between a generally vertical stowage position to said housing, to a deployment position wherein said support frame angles upwardly and outwardly relative to said aircraft.

5. The evacuation chute arrangement as defined in claim 4, wherein said suspension frame is mounted within said structure adjacent a rear portion of said structure, whereby within said stowage position said frame is maintained within the interior of said structure adjacent a rear portion thereof.

6. The evacuation chute arrangement as defined in claim 1, further comprising a chute support pivotally mounted within said carrier structure for carrying said chute, and moveable between a first position wherein said chute is enclosed within said carrier structure, to a second, deployment position wherein said support angles downwardly and outwardly relative to said aircraft by an angle to urge the chute by force of gravity outwardly from said housing.

7. The evacuation chute arrangement as defined in claim 6, further comprising a chute housing for containing said chute, said housing being openable to release said chute therefrom upon deployment, said housing being carried on said chute support.

8. The evacuation chute arrangement as defined in claim 7, wherein said housing comprises a base and cover frictionally engaged together and adapted to separate upon suspension of said chute from said suspension frame.

9. The arrangement as defined in claim 7, wherein said housing comprises a base and cover frictionally engaged together and adapted to separate upon suspension of said chute from said suspension frame.

10. The evacuation chute arrangement as defined in claim 1, further comprising a chute housing for containing said chute, said housing being openable to release said chute therefrom upon deployment, said housing being releasably positioned within said carrier structure.

11. The evacuation chute arrangement as defined in claim 1, wherein said chute, when deployed, has a first uppermost end and a second opposed end, said arrangement further comprising a lower collapsable slide associated with said second end, said lower slide, when deployed, having a first uppermost end for receiving said descending passengers, and a second lowermost end for discharging said passengers.

12. The evacuation chute arrangement as defined in claim 11, wherein said lower slide is inflatable and includes a gas discharge means for inflation of said slide.

13. The evacuation chute arrangement as defined in claim 1, wherein said chute, when deployed, has a first uppermost end and a second opposed end, said arrangement further comprising an upper slide associated with said first end of said chute, said upper slide, when deployed, having a first upper end for receiving said passengers from said aircraft, and a second lower end for discharging said passengers into said chute, said chute, when deployed, being suspended from said suspension frame by a suspension means at a position downwardly displaced from said frame for accommodating said upper slide between said aircraft hatch and said chute.

14. The evacuation chute arrangement as defined in claim 13, wherein said upper slide further comprises a gas discharge means for inflation of said upper chute.

15. A deployment arrangement for deploying from an aircraft a flexible tubular emergency passenger evacuation chute, comprising:

a carrier structure for stowing said chute within a folded or bunched stowage position, including a chute support within said structure for supporting said chute, said chute support being separable from said carrier structure;

a chute suspension frame associated with said carrier structure and engaged to an upper end of said chute, said frame being moveable between a stowed position substantially adjacent to or enclosed within said carrier structure and a deployment position wherein said frame extends outwardly away from said carrier structure to displace a portion of said frame outwardly from said aircraft for the suspension of said chute from said portion within a generally vertical position;

means for removing said chute from said carrier structure; and means for displacing said carrier structure from a stowage position inboard of said aircraft and spaced apart from said hatch, to a deployment position abutting the shell of said aircraft at said hatch.

16. The arrangement as defined in claim 15, wherein said suspension frame is longitudinally extensible, for movement between a collapsed, stowed position associated with said carrier structure, to an extended deployment position extending outwardly from said housing.

17. The arrangement as defined in claim 16, wherein said suspension frame is telescopic.

18. The arrangement as defined in claim 15, wherein said suspension frame is pivotally mounted at the base thereof to said carrier structure, for movement between a generally vertical stowage position, to said housing, to a deployment position wherein said support frame angles upwardly and outwardly relative to said aircraft.

19. The arrangement as defined in claim 18, wherein said suspension frame is mounted within said structure adjacent a rear portion of said structure, whereby within said stowage position said frame is maintained within the interior of said structure adjacent a rear portion thereof.

20. The arrangement as defined in claim 15, further comprising a chute support pivotally mounted within said carrier structure for carrying said chute, and moveable between a first position wherein said chute is enclosed within said carrier structure, to a second, deployment position wherein said support angles downwardly and outwardly relative to said aircraft by an angle to urge the chute by force of gravity outwardly from said housing.

21. The arrangement as defined in claim 15, further comprising a chute housing for containing said chute, said housing being openable to release said chute therefrom upon deployment, said housing being releasably positioned within said carrier structure.

22. A method for deploying a flexible tubular emergency passenger chute from an aircraft at a hatch thereof, comprising the steps of:

providing an elongate flexible tubular chute, a carrier structure for stowing the chute within a folded or bunched stowage position, a suspension frame associated with the carrier structure and engaged to an upper end of the chute, the frame being pivotally mounted to the carrier structure;

displacing the carrier structure within said aircraft from a stowage position inboard of the aircraft and spaced apart from said hatch, to a deployment position abutting the shell of the aircraft at the hatch;

pivoting the suspension frame to a position whereby the suspension frame extends outwardly from the aircraft;

fastening the suspension frame or carrier structure to the aircraft frame, whereby structural rigidity of the suspension frame is enhanced;

removing the chute from the carrier structure whereby the chute is suspended in a generally vertical position from the suspension frame.

23. The method as defined in claim 22, wherein the step of providing includes providing a longitudinally extensible suspension frame, and further comprising the step of extending said frame longitudinally to form the deployment position thereof.

24. The method as defined in claim 22, comprising the further step of pivoting the suspension frame from a stowage position wherein the frame is housed substantially within the interior of the carrier structure, to a deployment position wherein the frame extends outwardly and upwardly relative to the aircraft.

25. The method as defined in claim 22, comprising the further step of providing a housing within the carrier structure for housing said chute, and further comprising the step of removing said housing from the carrier structure upon deployment of said chute, including the step of opening said housing to release said chute therefrom.

* * * * *